June 1, 1926.
J. E. SAPP
FAUCET
Filed March 5, 1924
1,587,186
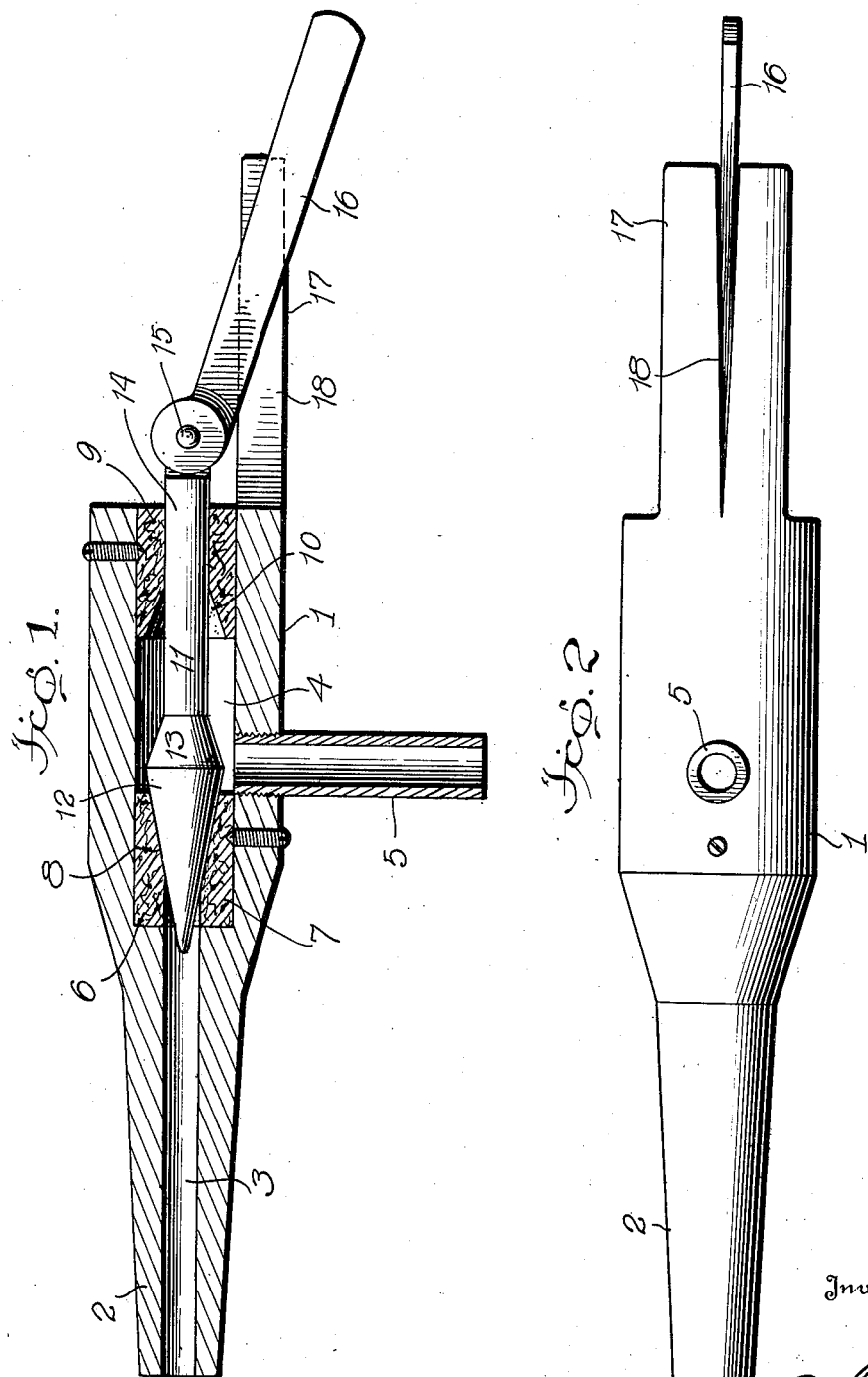
Inventor
James E. Sapp,
By
Attorney Patented June 1, 1926.

1,587,186

UNITED STATES PATENT OFFICE.

JAMES E. SAPP, OF BAINBRIDGE, GEORGIA.

FAUCET.

Application filed March 5, 1924. Serial No. 697,004.

My invention relates to faucets for casks or barrels or other liquid containing receptacles. Its object it to provide a simple construction inexpensive to produce, and efficient in effectively opening and closing the control valve or plug without leakage, and enabling the secure locking or holding of the valve-plug in its open and its closed adjustments.

To the accomplishment of the foregoing and such other objects as may hereinafter appear the invention consists in the features hereinafter particularly described and then sought to be clearly defined by the claims, reference being had to the accompanying drawing forming a part hereof, and in which:—

Figure 1 is a longitudinal section through the faucet;

Figure 2 is a bottom plan view of so much of the faucet as is necessary to clearly show the means for locking the plug-valve in its open and its closed positions.

In the drawing the numeral 1 indicates the faucet casing formed of wood or other non-corrosive material and having the tapering portion 2 to fit in the bung-hole of the cask or receptacle from which the liquid is to be drawn and through which a bore or passage-way 3 is formed for the flow of the liquid. The body portion of the faucet has an enlarged chamber or bore 4 from which leads the liquid discharge pipe 5. Within the enlarged chamber 4, between the pipe 5 and bearing against the shoulder 6 next to the bore 3, there is tightly fitted a gasket 7 of non-corrosive material, preferably cork, and which is formed with an internal tapering seat 8, and in the other end of the chamber 4 there is tightly fitted a gasket 9 of non-corrosive material, preferably cork, which is formed with an internal tapering seat 10. Within the chamber 4, between the two gaskets, is a plug valve 11, having oppositely tapered portions 12, and 13, the former being longer then the latter, and corresponding to the tapering seats formed in the two gaskets. The stem 14 of this plug extends through the gasket 9 and to its end is hinged, say by a pivot pin 15, an operating lever 16 or handle by means of which the double coned plug-valve may be moved back and forth, in one position filling the conical seat in gasket 7 and cutting off the outflow of the liquid through the gasket, and in its other position opening the valve for the outflow of the liquid and at such time having its conical face 13 fitting tightly in the conical seat of gasket 9 and effectively sealing the faucet against leakage.

The casing of the faucet has a rear extension 17 which is formed with a tapering slot 18 designed to receive and clamp the lever or operating handle 16 in either the forward or the rearward position of the plug-valve so as to hold the valve to its open or its closed adjustment.

The gaskets 7 and 9 may be secured in place by frictional contact with the wall of the chamber in which they fit or by threaded pins 19 passing through the valve casing and into the gaskets.

The faucet formed as described is simple in its parts, comparatively inexpensive to construct, efficient in operation, and the internal parts can be readily removed for repairs and replacement if necessary.

I have illustrated the preferred details of construction but changes can be made therein and essential features of the invention retained.

Having described my invention and set forth its merits what I claim is:—

1. The faucet comprising the casing having a longitudinally extending passage-way for liquid and an enlarged chamber at the inner end of said passageway forming a shoulder at the intersection of the passageway and chamber and a liquid discharge tube leading from the enlarged chamber, gaskets positioned in the enlarged chamber at opposite ends thereof, and closely fitting the walls of the chamber, one of the gaskets being seated against the shoulder at the end of the chamber, each gasket having an internal tapering valve seat, the enlarged portions of the seats facing each other, a valve stem passing through and supported by one of the gaskets and provided at one end with a valve externally tapered at its front and rear for seating in the tapered seat of the gasket toward which it moves in the opening and closing of the valve.

2. The faucet comprising the casing having a longitudinally extending passage-way for liquid and an enlarged chamber at the inner end thereof, gaskets positioned in the enlarged chamber at opposite ends thereof and formed in their ends facing each other with tapering valve seats, a plug-valve within the enlarged chamber formed with oppositely tapering portions to fit in the tapering valve seats of the gaskets when adjusted thereto and having a stem extended through one of the gaskets, an operating handle hinged to the valve stem, an extension to the casing formed with a tapering slot to receive the operating handle to secure the valve in its open and closed positions, and a liquid delivery tube leading from the enlarged chamber of the casing.

In testimony whereof I affix my signature.

JAMES E. SAPP.